March 29, 1966  R. E. CARPENTER ETAL  3,243,207
PLASTIC FLUID TIGHT SEALING DEVICE
Filed June 12, 1964  2 Sheets-Sheet 1

ROBERT E. CARPENTER
HENRY FIELITZ
INVENTORS

BY Daniel H. Bobis
ATTY

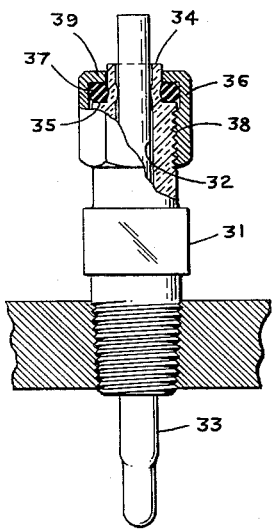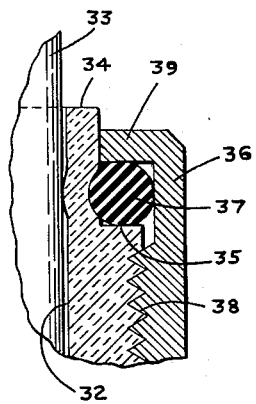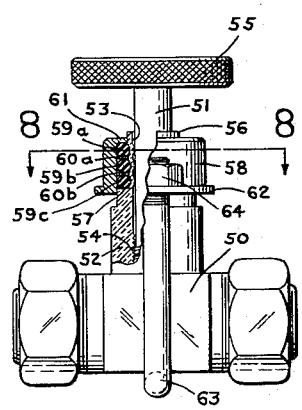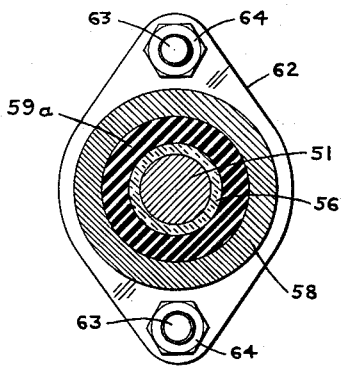

United States Patent Office 3,243,207
Patented Mar. 29, 1966

---

3,243,207
PLASTIC FLUID TIGHT SEALING DEVICE
Robert E. Carpenter, Nutley, and Henry Fielitz, Pompton
Plains, N.J., assignors to Chemplast, Inc., East Newark,
N.J., a corporation of New Jersey
Filed June 12, 1964, Ser. No. 374,714
2 Claims. (Cl. 285—248)

This invention relates generally to a fluid tight sealing device, and more particularly to the application of such sealing device to an improved fitting, joint assembly, or connector, made of a fluorocarbon resin adapted to coact with various types of rod or tubing made of glass, metal, plastic, etc., used in a variety of commercial and industrial applications.

The present invention concerns itself fundamentally with a method of producing a fluid tight seal using a tubular section of fluorocarbon resin adapted to coact with an elastomeric ring positioned relative to the surface of such tubular section; so as to be isolated from any flow of liquid or gas in the system in which the seal is used, and means for exerting compression on said elastomeric ring to permit it to exert uniform and continuous annularly disposed radially inward or outward forces on the tubular section to bring it into sealing contact with desired stationary, translating, or rotating member, and prevent leakage into or out of any assembly or system in which such seal is required.

In one of the preferred forms of the present invention this novel seal is shown as particularly adaptable to a design for a reusable fitting or connector made of fluorocarbon resin.

In liquid and gas transmission systems and assemblies used for example in experimental laboratory work wherein varying pressure conditions will exist, i.e., above and below atmospheric pressure, it has been common practice to connect the tubular sections in such systems to prevent leakage into or out of such systems or assemblies by the use of intricate glass fittings of ball and socket type, tapered glass joints, often requiring grease or other sealing means or clamped sections of flexible tubing made from elastomeric materials such as natural rubber, polyvinyl chloride, silicone rubber, etc.

There has been a long sought need for joints, fittings, and connectors which would increase the chemical usability in particular of the glass type tubular system or assemblies for chemical processes and at the same time provide the advantages of simplicity, reliability and permit quick and easy assembly and disassembly of the joints, fittings, and connections in such systems.

Certain heat resistant, chemically inert fluorocarbon resins, such as polytetrafluoroethylene and the like materials are suitable for use as connectors and fittings in such systems.

Thus, the present invention also covers a reusable fitting embodying said seal means made of a fluorocarbon resin wherein a relatively simple joint or connection is obtained when a tubular section formed outwardly from at least one end of the body member provides a shoulder and permits a compressible elastomeric ring means to be assembled on the tubular section in abutting relation with the shoulder; the body member and tubular section being bored to provide a flow passage and counterbored along the axial line of the bore to provide an aligned passage into which a tubular section of a laboratory system or assembly can be fitted, and the body member being adapted to permit a compressing assembly to exert longitudinal or axial forces against the elastomeric ring by moving it into abutting relation with the shoulder whereby the confined elastomeric ring will in turn exert the radial force required to hold and seal the fitting to the tubular section of the laboratory system or assembly.

The fitting or connection of the present invention is further characterized by a cone-shaped surface on the innermost aspect of the counterbore, to serve as a centering or aligning means for the tube section fitted therein and further to accept and center therein relatively large variations of a given tube size. The cone-shaped surface establishes an additional support means so that fully inserted tube sections are aligned and rigidly held if desired or alternatively flexibly held, permitting some shifting or redirection of the tubing, by not contacting the cone-shaped surface as the assembly or use of the fitting or connector may require.

Accordingly, it is an object of the present invention to provide a simple seal or joint employing the essentially true elastic nature of the elastomeric ring which will compensate for undesirable deformation under load sometimes referred to as the "plastic or cold flow" characteristic of fluorocarbon resins and other polymeric materials.

It is an object of the present invention to provide an improved reusable tube fitting for glass, metal, and plastic tubing.

It is another object of the present invention to provide an improved reusable tube fitting for glass, metal, and plastic tubing wherein the fitting is made of polytetrafluoroethylene or a fluorocarbon resin with similar qualities and physical characteristics.

It is another object of the present invention to provide a tube fitting which is made of a material which will permit it to seal by deformation under radially applied forces, but which material will essentially return to its original shape when the sealing forces are removed.

Further objects and advantages of the invention will become evident from the following description with reference to the accompanying drawings in which:

FIGURE 5 shows a temperature measuring device such as the thermometer with the seal means of the present invention shown thereon in vertical section.

FIGURE 6 is a fragmentary view of the seal used on the thermocouple of FIGURE 5.

FIGURE 7 shows a valve with the seal means of the present invention shown thereon in vertical section with a further form of compressing assembly.

FIGURE 8 is a horizontal section taken on line 4—4 of FIGURE 7.

Figure 1:
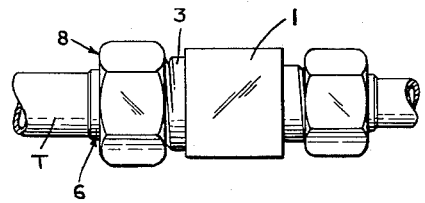
FIGURE 1 is a side elevation of one form of the present invention as applied to a connector or fitting known as a Union Reducer.

Referring to the drawings FIGURES 1, 2, 3 and 4 show the seal as applied to a fitting or connector, while FIGURES 5, 6, 7, and 8 show the seal as applied to other devices.

Fitting or connector

In FIGURES 1, 2, 3, and 4, the seal is embodied into a fitting or connector so as to hold and to seal the various portions of a tubing system in assembled relation.

FIGURE 1 shows a connector for tubing T known as a union reducer which includes a body portion generally designated 1 which is fabricated of polytetrafluoroethylene. The body portion is shown as generally rectangular, but can have an outside configuration such as round, square, triangular, etc.

Figure 2:
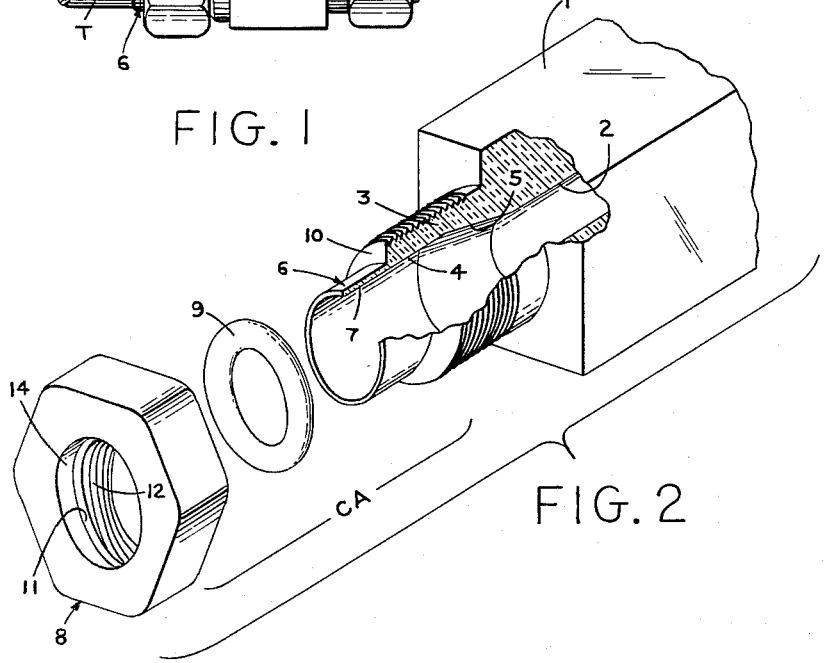
FIGURE 2 is a partial exploded view of the connector showing the seal means, as applied to the connection shown in FIGURE 1, with one form of compressing assembly.
Figure 3:
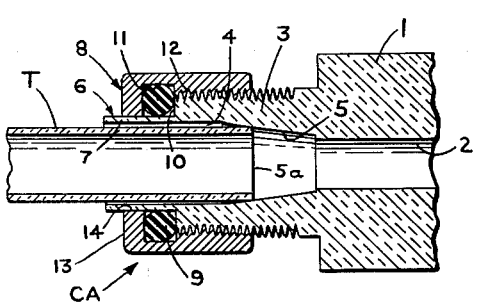
FIGURE 3 is a vertical section taken through the connection and tube member shown in FIGURE 1 before the compressing assembly has sufficiently engaged the threaded portion, to compress the elastomeric ring and effect a seal.
Figure 4:
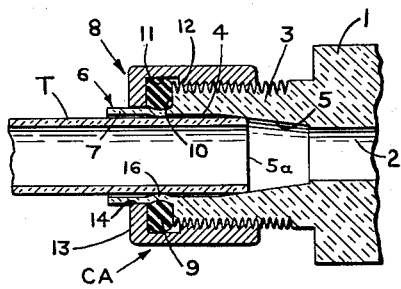
FIGURE 4 is a vertical section taken through the connection and tube member in FIGURE 1 after the compressing assembly has been brought into tight engagement both sealing and clamping the tube within the fitting.

As indicated in FIGURES 2, 3, and 4, the body will have a bore 2 extending along the longitudinal line thereof and at least at one end the body 1 is threaded as at 3.

Inwardly this threaded end of the body portion has been counterbored as at 4 to a dimension adapted to receive a given size of the tube T.

The counterbore 4 has a cone-shape as at 5, at its innermost aspect and the tubing element will during assembly be thrust into the counterbore until the edge 5a of the tubing will be brought into engagement with the cone-shaped portion 5 of the counterbore 4.

The cone-shaped portion on the inner aspect of the counterbore serves as a centering or alignment means for tubing in the system in which the connector is used, and helps to provide a snug fit for those tubes having relatively wide variations in dimensions from the specific size tube for which the connector bore has been designed.

When a tube is inserted into the connector so that it is brought into full contact with the cone-shaped portion of the counterbore, and the seal is established about the tube as hereinafter described, a two-position supporting means is established for the tube which provides sufficient rigidity to permit an entire system with joints of this type to be self-supporting.

Alternatively tubing can be inserted into the connector only part way so that it does not contact the cone-shaped portion at the inner aspect of the counterbore. In this event when the seal is established about the tubing as hereinafter described such seal then provides the only support point for the end of the tube and the resulting connection is not rigid but highly flexible, so as to permit some shifting and redirection of the tubing, as with a swivel joint, the joint of course being sealed but not having the characteristic of self-support that is obtained when the end of the tube is brought into abutment with the cone-shaped portion of the counterbore.

Freedom to choose either the rigid or the flexible connecting joint is extremely useful when assembling custom or experimental transmission systems or assemblies in the laboratory or on the research bench.

Projecting outwardly from at least one end of the body member 1 is a tubular section 7. The outer surface 6 of this tubular section 7 being of substantially less diameter than the threaded portion 3 forms a shoulder 10 for purposes which will appear clear hereinafter.

The inner diameter of the tubular section 7 is the same as the counterbore 4 and is continuous therewith, and as shown on the drawings the wall thickness of the tubular section 7 is relatively thin.

When the tubing T is in assembled position, the tubular section 7 by reason of its close proximity thereto as shown in FIGURES 3 and 4 and further the semi-elastic characteristic of the polymeric resin such as polytetrafluoroethylene will when it coacts with a compressing assembly generally designated C.A. be subjected to radially incurred deformation to effect a relatively simple sealing arrangement and provide means for holding the tubing T in its assembled position in the counterbore 4.

The compressing assembly comprises three elements; the confining shoulder 10, a locking nut 8 and the elastomeric ring element 9. The locking nut can be hexagonal, knurled, fluted, etc., to permit hand tightening or the application of conventional tools thereto, and is made of a semi-rigid plastic or metal. It has an undercut 11 and is threaded as at 12 along a portion of its length. At one end of the locking nut, a transverse end flange 13 extends inwardly and forms an opening as at 14 having a diameter slightly greater than the outside surface of the tubular section 7.

The locking nut 8 is threadably mounted on the threaded portion 3 of the body member 1 and the opening 14 will by reason of its diameter have a sliding fit about and over the outer surface 6 of the tubular section 7 which extends axially from the threaded portion 3 of the body member 1.

FIGURES 3 and 4 further show that the undercut is so sized that the elastomeric ring element 9 may be placed or held therein prior to or during assembly.

Thus, when the locking nut 8 is threaded or advanced toward the body member as shown in FIGURES 3 and 4, the elastomeric ring element 9 will be carried with the nut as it moves along tubular section 7.

On further threading or advancing of the locking nut onto the threaded portion 3, the elastomeric ring element 9 will be compressed by the squeezing action of the transverse end flange 13 and the shoulder 10, and because it is prevented from moving outward by the rigid locking member, it will move inward and exert a radial inward force against the outer surface of the tubular section 7.

This radial inwardly directed force will cause the tubular section 7 to deform inwardly as at 16, and as shown in FIGURE 4, until it contacts tube T. Tubular section 7 upon contacting tube T will similarly exert an inwardly acting force and hold tube T in assembled position in the counterbore, and because the deformation is continuous circumferentially, a seal between the tubular section 7 and tube T is simultaneously achieved.

When the longitudinally applied compressing forces on the elastomeric ring element 9 are reduced, the corresponding radial inward forces acting on the tubular section at 16 will also be reduced and as a result, the deformation of the tubular section at 16 will tend to return to its original inside dimension, thus releasing the tubing so that it can be easily removed.

It will be further noted that the sealing area 16 is disposed some distance into the counterbore from the outer end of the tubular section 7. Thus, the outer end or the size of the opening of the tubular section 7 remains relatively unchanged even after a (seal) has been effected with a tube that may be considerably undersize. This unchanged opening acts as a guide and permits easy insertion of subsequent tubes, and enhances the reusability of the fitting.

The fitting above described is particularly adapted for manufacture from polytetrafluoroethylene although it is clear that it is not intended that the invention should be so limited as these fittings can be made from any other suitable material having the characteristics of this type of plastic.

It will further be noted that because of the type of material, it will essentially return to its original shape when the pressure of the elastomeric ring is removed, thus permitting easy disassembly of the glass tubing and easy subsequent reuse of the fitting.

It should be also noted that the use of an elastomeric ring element in this invention provides a long-term sealing effect by nature of its built-in expansibility. Thus, as the tubular section undergoes plastic deformation or "coldflow" upon prolonged standing under sealing pressure, the elastomeric ring element will continue to exert an inwardly acting force maintaining an adequate sealing pressure.

Also because of the resilient nature of the elastomeric element, the present invention is suitable to seal tubing having wide size tolerances and out of roundness.

Another advantage of this invention is the elimination of the need to disassemble the body of the connector from its parts. There are no loose sleeves or ferrules which might become damaged or lost.

Also, another design feature of this invention permits the tightening of the nut and sealing to occur without any torsional effects on the tubing. Since the tubular section is fixed, the only forces acting on the tubings are the radial inward holding and sealing forces.

Other applications

FIGURE 5 shows the application of the present invention to a temperature measuring device wherein a seal is provided to render the thermometer therein fluid tight so as to prevent leakage into or out of the system in which the temperature measuring device is used.

This form of the invention would be equally applicable to other measuring, indicating, sensing, controlling devices such as thermocouples, radiation detectors, resistance bulbs, protecting tubes, etc.

The thermometer seal fitting includes a body portion 31 having a longitudinally extending bore 32 therein which permits the straight body portion of the thermometer 33 to pass through and extend beyond as the application requires.

The body portion of the seal fitting is made of polytetrafluoroethylene or other polymeric materials having similar characteristics.

The sealing end of the body member 32 is threaded about its outer surface 38 and at its outermost end reduces to a tubular section 34 whose outer diameter is substantially smaller than the threaded portion so as to form a shoulder 35 for purposes which will appear clear hereinafter.

The tubular section 34 of the body member coacts with a compressing assembly which exerts radially inward deforming forces thereon so that a relatively simple holding and fluid tight sealing means is provided.

In this form of the compressing assembly, the shoulder 35 coacts with a locking nut 36 and an elastomeric ring element 37. The elastomeric ring element 37 fits about the tubular section 34 and will be held initially in light contact with the shoulder 35 by means of the locking nut 36.

The locking nut can take any suitable shape to permit the hand or any conventional tool to be used to thread it on and off the threaded portion 38 of the body member.

The transverse end flange 39 of the nut 36 will have a bore such that it fits about the tubular section 34 and moves the elastomeric ring element into abutment with the containing shoulder 35.

Thus, when the locking nut is threaded or advanced toward the body member, the elastomeric ring element will become compressed to an increasing degree by the squeezing action of the transverse end flange 39 and the containing shoulder 35. Since it is prevented from moving outward by the containing action of the locking nut, it will exert a radial inward force against the outer surface of the tubular section 34 and cause the tubular section to deform as shown in the fragmentary view of FIGURE 6.

This inward deformation provides a holding means and more particularly a fluid tight sealing means for the thermometer and having the applicable advantages previously noted for fittings and connectors.

In FIGURES 7 and 8, the seal is applied to serve as a packing gland for the valve stem 51 of a valve generally designated 50.

The valve 50 includes a valve body 52 made of any suitable plastic material such as polytetrafluoroethylene or similar fluorocarbon resin.

The valve body 52 has a valve stem bore 53 which is threaded as at 54 to threadably receive the valve stem 51 therein.

Valve stem 51 extends at one end externally of the valve body where it connects to a hand operated actuating member 55. At the other end a valve head (not shown) coacts with a valve seat (also not shown) in the valve body 52, in the conventional manner as is well understood by those skilled in the art and therefor not more fully described herein because it forms no part of the present invention.

About the portion of the valve body 52 at the end having the valve stem bore 53 therein, the valve body is provided with a tubular section 56 whose inner diameter is the valve stem bore 53 and the outer diameter of which is substantially less than that of the valve body 52 at that point so that a confining shoulder 57 will be formed similar to that as above described for the form of the invention shown in FIGURE 1.

The tubular section 56 of the valve body 52 also coacts with a compressing assembly adapted to exert radially inward deforming forces thereon so that a relatively simple fluid tight sealing means is provided for the valve stem 51.

In this form of compressing assembly, the confining shoulder 57 coacts with a locking cap 58 and elastomeric ring elements 59a, 59b, and 59c. The elastomeric ring elements 59a, 59b, and 59c fit about the tubular section 56 and will be held initially in light contact with rigid free floating spacers 60a and 60b, the confining shoulder 57 and the locking cap 58.

The locking cap 58 has at one end a transverse end flange 61 similar to that described for the form of the invention shown in FIGURE 1 and a flange 62 about the open end remote from the transverse end flange. The flange 62 has openings (not shown), to permit rod ends of U-bolt 63 to pass there-through and permit clamping nuts 64 to move and hold said locking cap 58 in the desired longitudinal positon relative to the shoulder 57.

When the clamping nuts 64 are threaded onto their respective U-bolt rod ends and brought into abutting relation with the flange 62 the locking cap 58 of which it is a part will on further threading move longitudinally towards the shoulder 57 thereby compressing the elastomeric elements 59a, 59b, and 59c. As the elastomeric ring elements 59a, 59b, and 59c are compressed to an increasing degree by this squeezing action between the shoulder 57 and the transverse end flange 61, and since they are prevented from expanding or deforming in a direction away from the tubular section 56 they exert radial inward force on its outer surface and cause the tubular section 56 to deform as shown in FIGURE 7 of the drawings.

The inward deformation caused by each ring element is uniform and acts as a number of fluid tight circumferential seals about the valve stem 51. The number of sealing areas can easily be varied by increasing or decreasing the number of ring elements 59 and spacers 60 as the application requires.

Thus, a simple packing gland is provided for the valve stem shown. Essentially without modification this sealing arrangement would also be suitable for non-rotating valve stem applications, as well as numerous other rotating and translating seal applications.

It will be understood that the invention is not to be limited to the specific construction or arrangement of parts shown, but that they may be widely modified within the invention defined by the claims.

What is claimed is:

1. A reusable plastic fitting releasably connectible in fluid tight relation to a tube in a tubing system and the like type element comprising:
   (a) a body member made of a fluorocarbon resin material having a bore therein,
   (b) said body member having at least one portion of predetermined thickness between the wall of the bore and the outer periphery of the body member,
   (c) a tubular section formed continuously with said one portion of the body member and projecting outwardly therefrom,
   (d) said tubular section having an inner surface continuous with the wall of said bore to form a passage in the tubular section open at the end remote from the bore to permit the element to be sealed to extend therethrough,
   (e) said tubular section having a thickness less than one-half the thickness of said one portion of the body member, the difference in outside diameter resulting from said thickness difference forming an abutment means with said one portion substantially normal to the longitudinal axes of said fitting, (f) the dimension of the outer surface of the tubular section sized relative the dimension of the inner surface of said tubular section whereby said tubular section has a thin annular radially deformable wall, (g) compression means including:
  (1) at least one elastomeric ring element disposed about said tubular section for contact intermediate the surface of the wall of the tubular section remote from the passage means therein and disposed to be moved into and out of engagement with the abutment means,
  (2) an element disposed about the tubular section outboard of said elastomeric ring element having an axially extending portion and a radially inward extending flange for confining said elasmeric ring element in position and undercut to allow for radial expansion of said elastomeric ring element during engagement with said abutment means,
  (3) and means for actuating said confining element to move said elastomeric ring element into and out of engagement with the abutment means to cause said elastomeric ring element in engaged position to exert a radially directed releasable force against an intermediate portion of the wall of said tubular section to deform the same into uniform annular engagement with the element to be sealed, (h) the thin walled tubular section projecting outwardly from the adjacent portion of the body to which it is connected a distance at least beyond the confining element of the compression means prior to deformation of said elastomeric ring to isolate the elastomeric ring element from leakage fluid against which said fitting fails to effect sealing and to pass said leakage fluid to a point external of the fitting.

2. In a reusable plastic fitting as claimed in claim 1 wherein:
  (a) the passage means in said tubular section has a diameter greater than the bore in said body member,
  (b) a portion of the continuous inner wall between the passage means and the bore having a cone shape,
  (c) said cone shaped wall portion disposed to center and align the inner end of the element to be sealed during assembly.

References Cited by the Examiner
UNITED STATES PATENTS

| | | | |
|---|---|---|---|
| 808,195 | 12/1905 | Chaplin | 285—338 X |
| 863,901 | 8/1907 | Brumbaugh | 285—199 |
| 1,750,790 | 3/1930 | Bessonett | 285—342 |
| 2,470,546 | 5/1949 | Carlson | 285—382.7 X |
| 2,704,678 | 3/1955 | Klein et al. | 285—382 X |
| 2,755,110 | 7/1956 | Jacobs. | |
| 3,016,250 | 1/1962 | Franck | 285—342 |
| 3,104,899 | 9/1963 | McKenzie | 285—382.7 X |
| 3,108,827 | 10/1963 | Mason | 285—342 |
| 3,188,122 | 6/1965 | Smith | 285—423 X |

FOREIGN PATENTS

| | | |
|---|---|---|
| 1,077,197 | 4/1954 | France. |
| 598,564 | 10/1959 | Italy. |

EDWARD C. ALLEN, *Primary Examiner.*

C. B. FAGAN, D. W. AROLA, *Assistant Examiners.*